(12) United States Patent
Gandhe et al.

(10) Patent No.: US 9,055,019 B1
(45) Date of Patent: *Jun. 9, 2015

(54) METHOD AND APPARATUS FOR MESSAGE MULTICASTING (71) Applicant: MARVELL INTERNATIONAL LTD., Hamilton (BM)

(72) Inventors: Maithili Gandhe, Issaquah, WA (US); Moinul H. Khan, San Diego, CA (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 14/094,664

(22) Filed: Dec. 2, 2013

Related U.S. Application Data

(63) Continuation of application No. 12/271,814, filed on Nov. 14, 2008, now Pat. No. 8,601,069.

(60) Provisional application No. 60/989,689, filed on Nov. 21, 2007.

(51) Int. Cl.
*G06F 15/16* (2006.01)
*H04L 12/58* (2006.01)

(52) U.S. Cl.
CPC ..................................... *H04L 51/26* (2013.01)

(58) Field of Classification Search
CPC ................................ G06F 15/16; H04L 51/26
USPC ......................................................... 709/207
See application file for complete search history.

(56) References Cited

U.S. PATENT DOCUMENTS

| | | |
|---|---|---|
| 6,490,611 B1 | 12/2002 | Shen et al. |
| 6,934,287 B2 | 8/2005 | Okamura |
| 7,230,923 B2 | 6/2007 | Onvural et al. |
| 7,272,144 B2 | 9/2007 | Cloonan et al. |
| 7,450,506 B2 | 11/2008 | Morikawa et al. |
| 7,457,243 B2 | 11/2008 | Meggers et al. |
| 7,657,672 B2 | 2/2010 | Kampmann et al. |
| 7,710,962 B2 | 5/2010 | Kodama et al. |
| 7,774,417 B2 | 8/2010 | Callanan et al. |
| 7,813,367 B2 | 10/2010 | Davis et al. |
| 7,877,514 B2 | 1/2011 | Shao et al. |
| 8,077,601 B2 | 12/2011 | Maze et al. |
| 8,265,091 B2 | 9/2012 | Firoiu et al. |
| 8,306,060 B2 | 11/2012 | Ngo et al. |

(Continued)

OTHER PUBLICATIONS

Gandhe, et al., "Method and Apparatus for Weighted Message Passing," U.S. Appl. No. 12/271,818, filed Nov. 14, 2008.

(Continued)

*Primary Examiner* — Arvin Eskandarnia

(57) ABSTRACT

A method and system for message multicasting which provides a programmable persistent header in a message to allow one message to be read by multiple target consumers and to ensure that the message passing mechanism does not delete the message until all target consumers have received it. The persistent header may have information about all target consumers and their priority to consume the message. A message parser may obtain from the persistent header identities of target consumers and the order in which they consume the message and allow target consumers to consume the message following the order. The message parser may have a counter which counts the number of consumers that have consumed the message, and keep the message in the queue until all target consumers have consumed the message.

20 Claims, 7 Drawing Sheets

Un-Wrapped State of Operation

Wrapped State of Operation

(56) References Cited

U.S. PATENT DOCUMENTS

| | | | |
|---|---|---|---|
| 8,788,591 B2 | 7/2014 | Jiang et al. | |
| 2003/0202525 A1 | 10/2003 | Nagatomo | |
| 2004/0160971 A1 | 8/2004 | Krause et al. | |
| 2005/0091367 A1* | 4/2005 | Pyhalammi et al. | 709/224 |
| 2005/0124360 A1 | 6/2005 | Choi | |
| 2005/0193421 A1* | 9/2005 | Cragun | 725/80 |
| 2005/0267941 A1* | 12/2005 | Addante et al. | 709/206 |
| 2006/0031358 A1* | 2/2006 | Canis | 709/206 |
| 2006/0036606 A1* | 2/2006 | Hildebrand et al. | 707/10 |
| 2006/0168080 A1 | 7/2006 | Surlaker et al. | |
| 2006/0195538 A1* | 8/2006 | Miller et al. | 709/206 |
| 2006/0242669 A1 | 10/2006 | Wogsberg | |
| 2006/0271645 A1* | 11/2006 | Theimer et al. | 709/218 |
| 2006/0277330 A1 | 12/2006 | Diepstraten et al. | |
| 2007/0156834 A1 | 7/2007 | Nikolov et al. | |
| 2007/0180035 A1 | 8/2007 | Liu et al. | |
| 2008/0133717 A1* | 6/2008 | Bouchat et al. | 709/220 |
| 2008/0215668 A1* | 9/2008 | Hu | 709/202 |
| 2008/0243675 A1* | 10/2008 | Parsons et al. | 705/37 |
| 2009/0006546 A1* | 1/2009 | Blumrich et al. | 709/204 |
| 2009/0150977 A1* | 6/2009 | Carley | 726/3 |
| 2009/0219820 A1* | 9/2009 | Acke et al. | 370/241 |
| 2009/0252219 A1 | 10/2009 | Chen et al. | |
| 2009/0307372 A1* | 12/2009 | Eller et al. | 709/235 |

OTHER PUBLICATIONS

IEEE Std 802.11e/D11.0, "IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements," *The Institute of Electrical and Electronics Engineers, Inc.*, pp. 1-196 (Oct. 2004).

IEEE P802.1AS/D0.8, "Draft Standard for Local and Metropolitan Area Networks—Timing and Synchronization for Time-Sensitive Applications in Bridged Local Area Networks," The Institute of Electrical and Electronics Engineers, Inc., pp. 1-149 (May 25, 2007).

* cited by examiner

| 31:8 | 7:6 | 5:4 | 3:2 | 1:0 |
|---|---|---|---|---|
| Rsvd | 01 | 00 | 11 | 10 |

METHOD AND APPARATUS FOR MESSAGE MULTICASTING

CROSS REFERENCE TO RELATED APPLICATION

This application is a continuation of U.S. patent application Ser. No. 12/271,814, filed Nov. 14, 2008, entitled "Method and Apparatus for Message Multicasting," now U.S. Pat. No. 8,601,069, which claims the benefit of priority to previously filed U.S. provisional Patent Application No. 60/989,689, filed Nov. 21, 2007, entitled METHOD AND APPARATUS FOR SOURCE DIRECTED MULTICASTING OF MESSAGES IN DEEPLY EMBEDDED PARALLEL MULTIMEDIA SYSTEMS. The applications referenced above are hereby incorporated by reference in their entireties.

The present application is related to the following U.S. Patent Application, which is assigned to the assignee hereof and incorporated herein by reference in its entirety: U.S. patent application Ser. No. 12/271,818, entitled METHOD AND APPARATUS FOR WEIGHTED MESSAGE PASSING, and filed Nov. 14, 2008.

BACKGROUND

1. Field of the Disclosure

The present disclosure relates generally to message passing, and more particularly to message passing in multimedia systems.

2. Description of Related Art

Figure 1A:
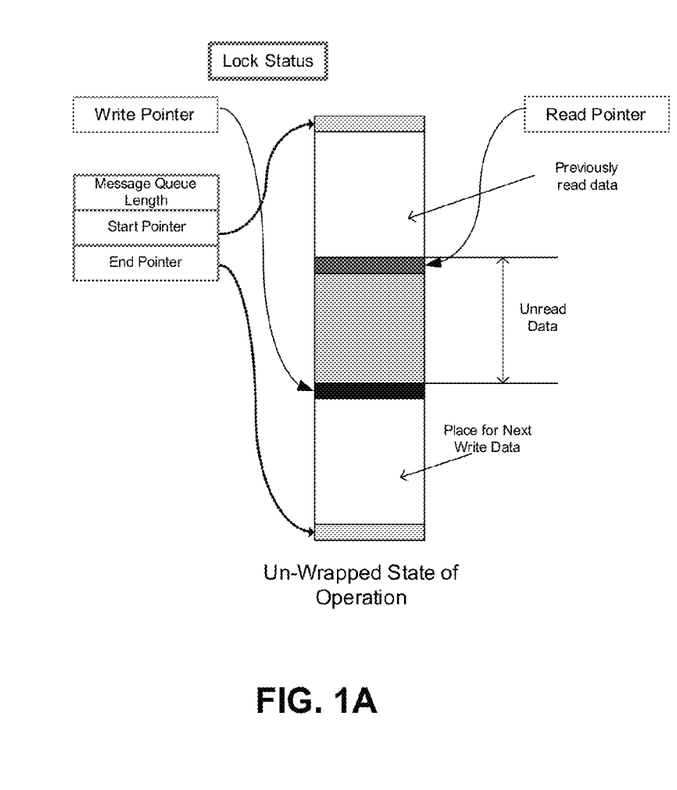
FIGS. 1A-1C illustrate a prior art system for message passing and its operation.
Figure 1B:
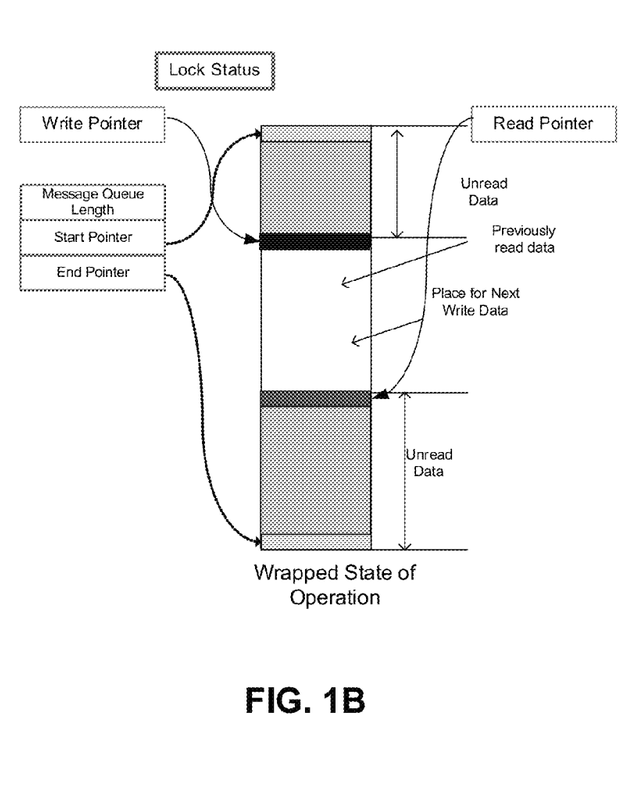

The need for greater processing power in multimedia systems along with power consumption constraints has led to a new era of parallel computing or multi-core designs. One feature of parallel computer architecture is its inter-process communication (IPC). Message passing is one of the methods used for IPC. A prior art message passing system consists of FIFOs wherein the message buffers are written by one microprocessor (a "producer") and read by another microprocessor (a "consumer") respectively. FIGS. 1A and 1B illustrate a prior art message passing system consisting of a simple FIFO (First-In-First-Out). A message queue may have a start pointer and an end pointer, and the queue length therebetween is the message queue length. A write pointer and a read pointer are maintained and used to indicate a portion for previously read data, a portion for unread data, and a portion available for new data. When a producer writes a message to the queue, the write pointer is incremented, and when a consumer reads a message from the queue, the read pointer is incremented. FIG. 1A illustrates an un-wrapped state of operation wherein the write pointer is less than the read pointer, and FIG. 1B illustrates a wrapped state of operation in which the previously read data and the data to be written share the same portion.

Figure 1C:
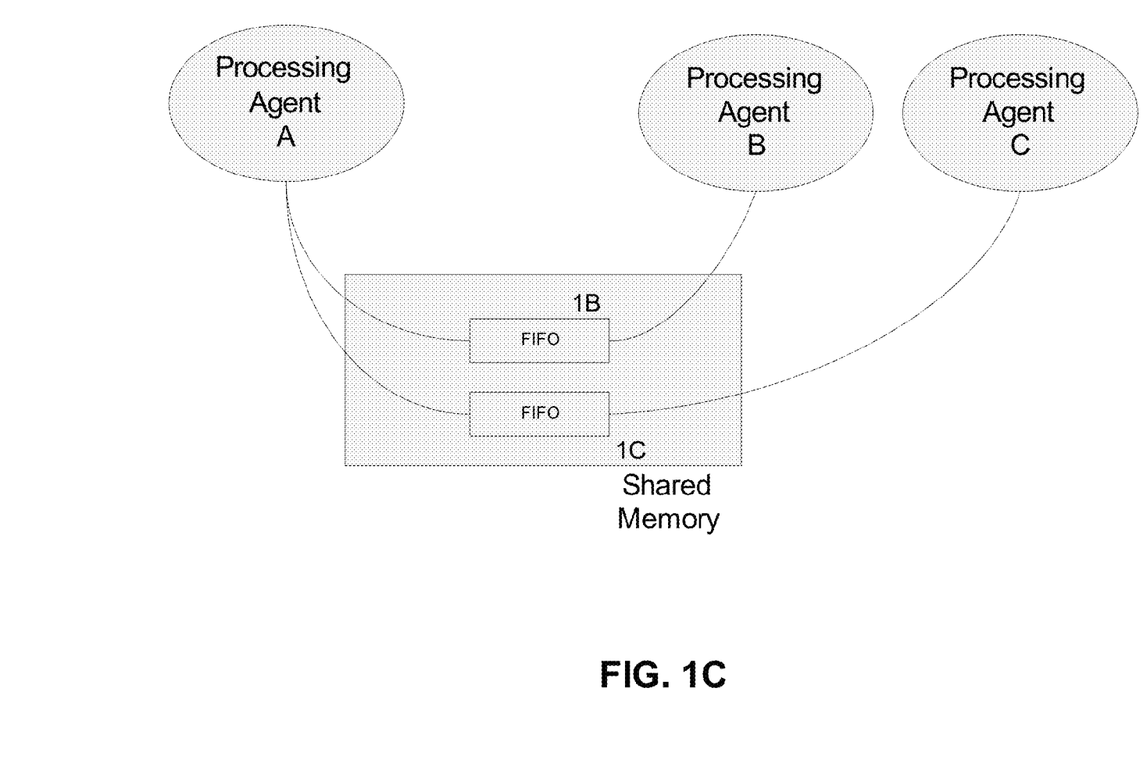

In the system shown in FIGS. 1A and 1B, a message can be consumed by one consumer, since once a message is consumed, the read pointer in the FIFO increments, and the message is removed from the FIFO. To have a message from a producer be read by multiple consumers, the message has to be written in multiple queues, which considerably increases memory footprint. As shown in FIG. 1C, if a processing agent A wants to have a message read by a processing agent B and a processing agent C, it has to write the same message to a queue in FIFO 1B for the processing agent B and in a queue in FIFO 1C for the processing agent C. Writing the same message into multiple queues considerably increases the memory footprint. In addition, multiple FIFOs have to be read. Further, the system needs extra control logic to synchronize the messages in the queues.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

The present invention provides a method and system for message multicasting which provides a programmable persistent header in a message to allow one message to be read by multiple target consumers and to ensure that the message passing mechanism does not delete the message until all target consumers have received it. The persistent header may have information about all target consumers and their priority to consume the message. A message parser may obtain from the persistent header identities of target consumers and the order in which they consume the message and allow target consumers to consume the message following the order. The message parser may have a counter which counts the number of consumers that have consumed the message, and keep the message in the queue until all target consumers have consumed the message. Such a message multicasting system may have increased efficiency, fewer memory accesses, inherent event handling and reduced system overhead. In addition, the persistent header may be independent of the configuration of memory types. Advantages of the present invention will become apparent from the following detailed description.

Figure 2:
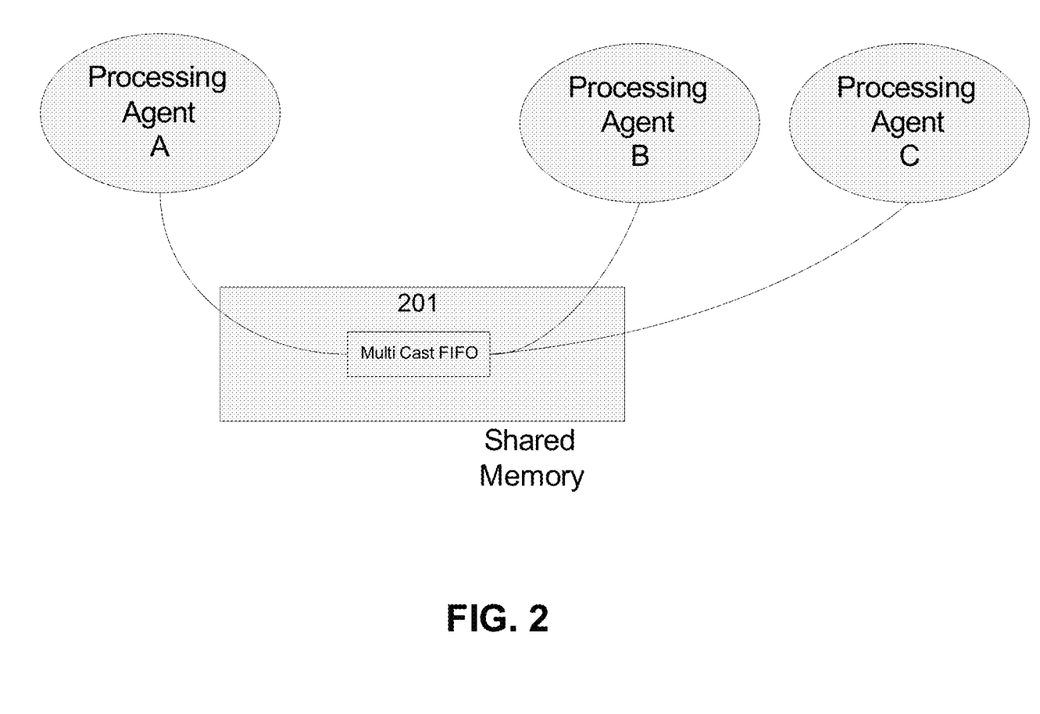
FIG. 2 illustrates a system of message multicasting according to one embodiment of the present invention.

FIG. 2 illustrates the relationship between a producer and its target consumers according to one embodiment of the present invention. Instead of writing a message to multiple queues, as the prior art system in FIGS. 1A-1C does, a processing agent A may, in the embodiment shown, only need to write the message to a multicast FIFO 201 once if it wants a processing agent B and a processing agent C to consume the message. The processing agents B and C may pull the message from the multicast FIFO 201.

Figure 3A:
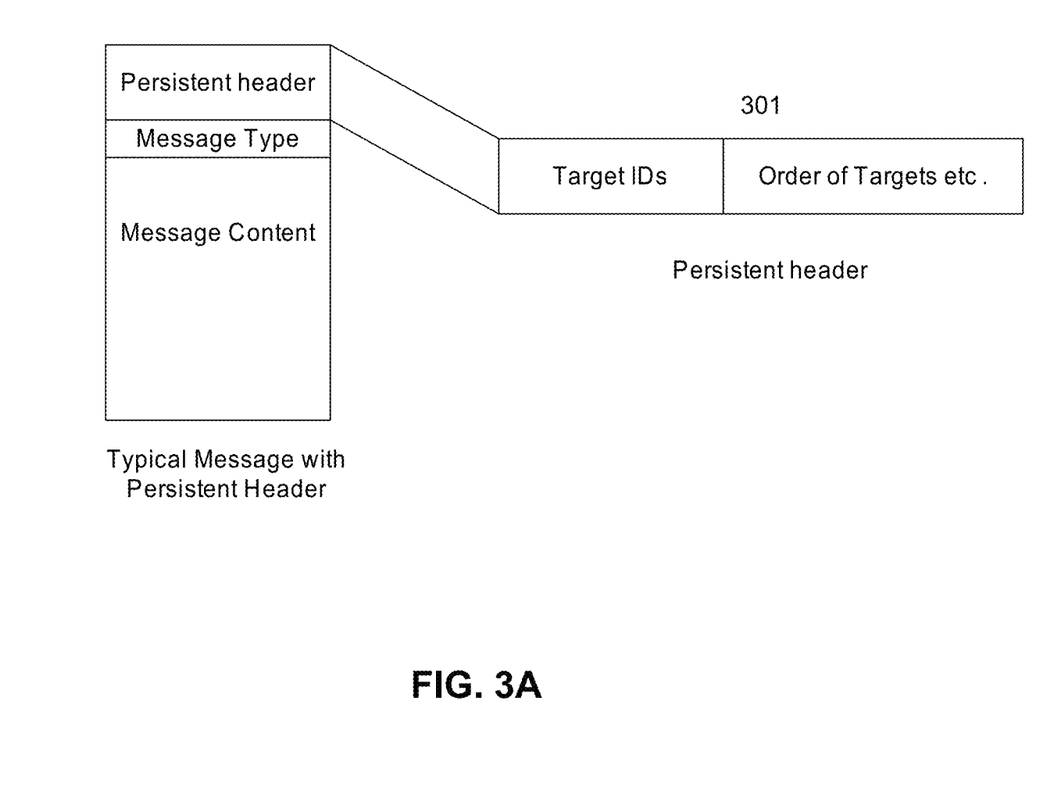
FIG. 3A illustrates a format of a message according to one embodiment of the present invention.

FIG. 3A illustrates the format of a message according to one embodiment of the present invention. A persistent header 301 may be added to a typical message which includes a message type section and a message content section. The persistent header 301 may contain identities of target consumers, indicating the consumers to which the message is destined. The persistent header 301 may also carry information about the order in which the target consumers consume the message, e.g., which consumer is going to consume the message first, and which consumer is going to consume it last.

Figure 3B:
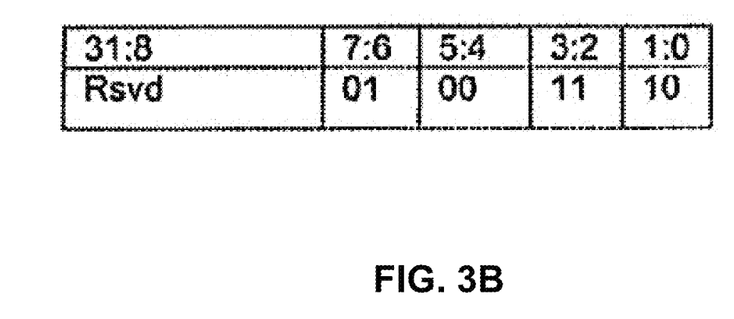
FIG. 3B illustrates an example of a persistent header according to one embodiment of the present invention.

FIG. 3B illustrates an example of a persistent header according to one embodiment of the present invention. The exemplary persistent header may have thirty two bits, used in a system which has four cores (e.g., 0, 1, 2 and 3) and a producer may want three of them to read the message, following a sequence (e.g., 3, 0, and 1). The first row in FIG. 3B may represent bit numbers in the persistent header, and the second row may represent values of corresponding bits. In particular, bits 0 and 1, in the right-most column, may indicate the number of bits used to represent the identity of a target consumer, and two bits may be used to represent a target consumer when their value is "10." In the example shown in FIG. 3B, a message has three target consumers, so two bits are enough to represent them. More bits may be used when there are more target consumers, e.g., three bits for up to eight target consumers, and four bits for up to sixteen target consumers.

Starting from bit 2, every two bits may represent the ID of a target consumer, from the target consumer with the highest priority to the target consumer with the lowest priority. In particular, bits 2 and 3, in the second column from the right end, are for the highest priority target consumer; bits 4 and 5, in the third column from the right end, are for the second priority target consumer; bits 6 and 7, in the fourth column from the right end, are for the third priority target consumer; and bits 8 to 31 may be reserved and may be used when there are more target consumers. In the example shown, the highest priority target consumer is the target consumer 3 represented by code "11", the second priority target consumer is the target consumer 0 represent by code "00", and the third priority target consumer is the target consumer 1 represented by code "01".

Figure 4:
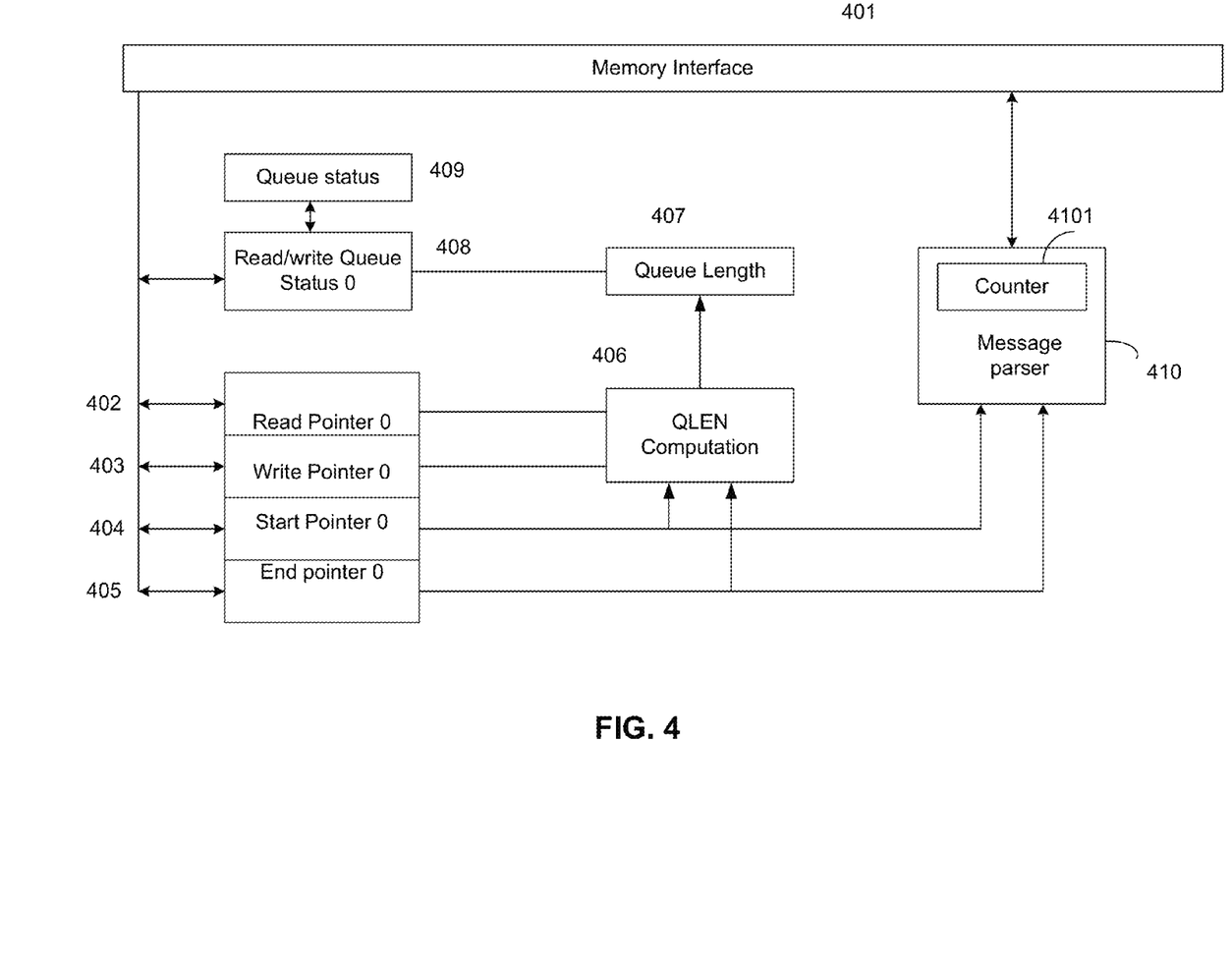
FIG. 4 illustrates a system for message multicasting according to one embodiment of the present invention.

FIG. 4 illustrates a system for message multicasting according to one embodiment of the present invention. A queue of messages may sit in a memory interface 401, which may be a random access memory (RAM) or a double data rate (DDR) memory. A start pointer 404 and an end pointer 405 may indicate the start and end of the queue respectively. A read pointer 402 may indicate the location of the message in the latest read operation, and a write pointer 403 may indicate the location of the message in the latest write operation. A pointer may be, e.g., a register. A QLEN computation module 406 may be coupled to a start pointer 404 and an end pointer 405, compute the queue length and forward it to a queue length module 407. The queue length module 407 may temporally store the queue length and forward it to a Read/write Queue status module 408, which in turn is coupled to a queue status module 409. The read/write queue status module 408 may store information related to the read pointer 402 and the write pointer 403. The queue status module 409 may store information about the queue, e.g., the queue length, the queue length of the data to be read and the available space for new data.

A message parser 410 may be added to the message passing mechanism. It may interact with the pointers and parse the persistent header in a message. According to the information in the persistent header, the message parser 410 may decide the target consumers and the order in which they consume the message. The message parser 410 may interact with the memory interface 401 to pull the actual message. The message parser 410 may be implemented by hardware or firmware or software.

The message parser 410 may have a counter 4101. In one embodiment, the counter 4101 may increment by one each time the message is consumed by one target consumer. The pointers will not be updated to the next message until the counter value reaches the number of target consumers, e.g., 3 for the persistent header shown in FIG. 3B. As a result, the message will not be removed from a queue until all target consumers have consumed the message. The counter 4101 may be implemented by registers.

In another embodiment, the counter value may be set to the number of target consumers, e.g., 3 in the embodiment shown in FIG. 3B. The counter may decrement by one each time the message is consumed by one target consumer. The pointer will not be updated to the next message until the counter value reaches 0. Other arrangements are also possible.

Figure 5:
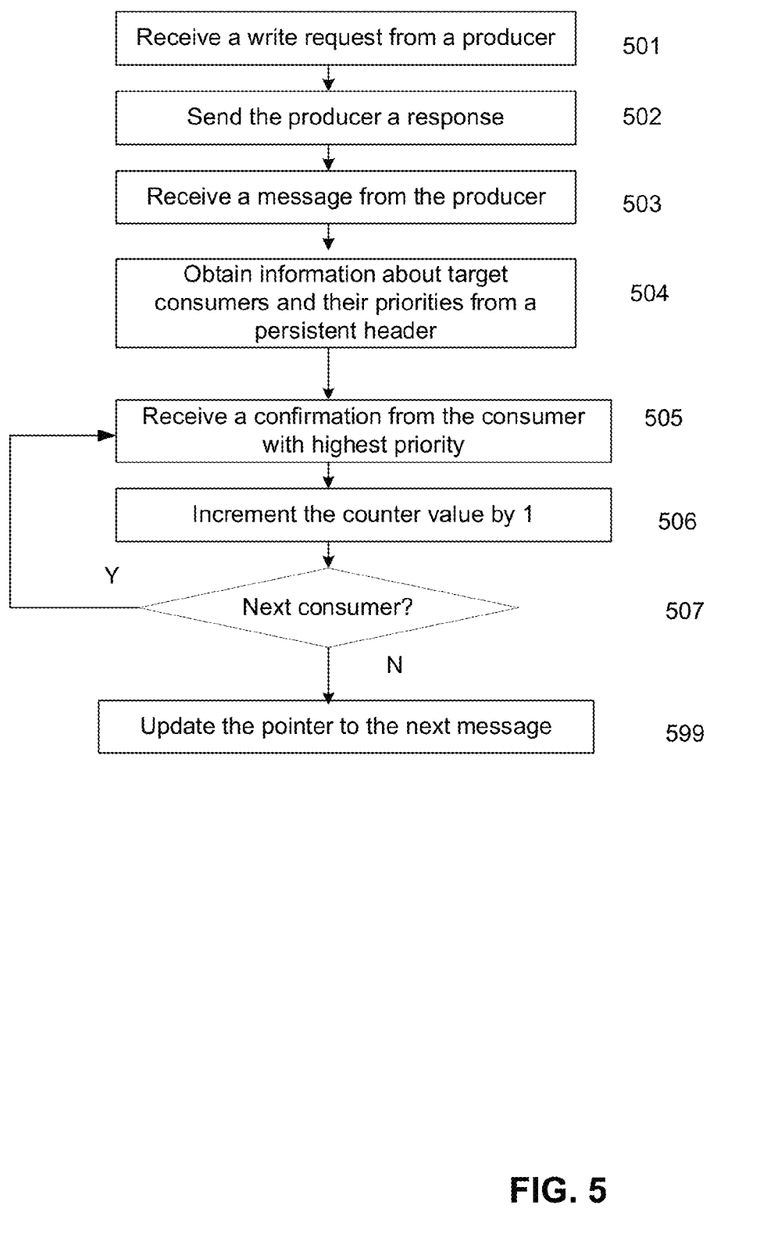
FIG. 5 illustrates a flow chart for a method of message multicasting according to one embodiment of the present invention.

FIG. 5 illustrates a flow chart of a method for message multicasting according to one embodiment of the present invention. The method may be used in the system shown in FIGS. 2 and 4. A processing agent A may write a message in a queue in the memory interface 401. The message may have a persistent header shown in FIG. 3B, indicating that the message has three target consumers, and the order of message consumption is 3, 0, 1.

At 501, the processing agent A, a producer, may send a request to the memory interface 401 for writing a message in a queue in the memory interface 401.

At 502, the memory interface 401 may send to the processing agent A a successful response, allowing the processing agent A to write a message in the queue.

At 503, the processing agent A may write a message to the queue. The message may conform with the format shown in FIG. 3A, and include a persistent header shown in FIG. 3B. The processing agent A may inform the memory interface 401 "write done" once the message is written.

The target consumers read the message according to their priorities. At 504, the message parser 410 may read the persistent header via the pointers, and find out the number of target consumers, their identities and the order in which they consume the message.

The target consumer with the highest priority, e.g., the target consumer 3, may read the message first, and send out a "read done" confirmation after a successful read operation. The message parser 410 may receive the "read done" confirmation at 505.

At 506, the counter value may increase by one.

At 507, it may be determined whether the persistent header includes another target consumer.

If yes, the process may repeat 505-507 for the target consumer which has the highest priority in the remaining target consumers. In particular, 505-507 may repeat for the target consumer 0 and then the target consumer 1.

Once the counter value reaches the number of target consumers from the persistent header, the read pointer may be updated to the next message, and the message from the processing agent A may become obsolete and may be removed from the queue at 511.

If the producer sends a "write discard" or a target consumer sends out a "read discard", the subsequent reads may be discarded and the message may be deleted.

With the message parser 410 and its counter 4101, when a producer wants a message to be read by multiple target consumers, it needs to write the message only once, in one queue in this embodiment. Accordingly, it is not necessary to maintain multiple queues. Memory footprint may be significantly reduced, and the control logic for synchronizing messages in the multiple queues may be avoided.

Several features and aspects of the present invention have been illustrated and described in detail with reference to particular embodiments by way of example only, and not by way of limitation. Alternative implementations and various modifications to the disclosed embodiments are within the scope and contemplation of the present disclosure. Therefore, it is intended that the invention be considered as limited only by the scope of the appended claims.

What is claimed is:

1. A system, comprising:
a memory to store messages; and
a message parser configured to
receive a pointer to a message i) stored in the memory and ii) targeted for delivery to a plurality of consumers, and
delete the message in the memory upon the earlier of i) the message having been consumed by each consumer among the plurality of consumers, and ii) a confirmation to discard the message having been received from a first consumer, among the plurality of consumers, that has consumed the message and that is associated with a first priority, thereby making the message unavailable for each second consumer, among the plurality of consumers, that is associated with a second priority lower than the first priority.

2. The system of claim 1, wherein the message parser is configured to receive an indicator of a number of consumers in the plurality of consumers.

3. The system of claim 1, wherein the message parser is configured to receive identities of the consumers in the plurality of consumers.

4. The system of claim 2, wherein the message parser comprises a counter configured to count how many consumers have consumed the message.

5. The system of claim 4, wherein the counter increments each time a consumer consumes the message.

6. The system of claim 4, wherein the counter decrements each time a consumer consumes the message.

7. The system of claim 1, wherein the message is stored in a queue, and consumers among the plurality of consumers read the message from the queue.

8. The system of claim 1, further comprising a register to store the pointer.

9. The system of claim 1, wherein the message parser is configured to permit consumers among the plurality of consumers to consume the message according to an order.

10. The system of claim 9, wherein the message parser is configured to determine the order based on priority information associated with the message.

11. A method, comprising:
determining, at a hardware device, an order in which a plurality of consumers are permitted to consume a message stored in a memory; and
deleting, with the hardware device, the message in the memory upon the earlier of i) the message having been consumed by each consumer among the plurality of consumers, and ii) a confirmation to discard the message having been received from a first consumer, among the plurality of consumers, that has consumed the message and that is associated with a first priority, thereby making the message unavailable for each second consumer, among the plurality of consumers, that is associated with a second priority lower than the first priority.

12. The method of claim 11, wherein determining the order is based on a persistent header in the message.

13. The method of claim 12, further comprising determining, with the hardware device, priority information associated with the plurality of consumers based on the persistent header in the message.

14. The method of claim 12, further comprising obtaining, with the hardware device, a number of consumers in the plurality of consumers from the persistent header.

15. The method of claim 12, further comprising obtaining, with the hardware device, identities of the first and second consumers from the persistent header.

16. The method of claim 11, further comprising incrementing, with the hardware device, a counter value by one after receiving each confirmation that a consumer, among the plurality of consumers, has consumed the message.

17. The method of claim 16, further comprising updating, with the hardware device, the pointer to a next message when the counter value equals a number of consumers among the plurality of consumers.

18. The method of claim 11, further comprising setting, with the hardware device, a counter value to a number of consumers among the plurality of consumers.

19. The method of claim 18, further comprising decrementing, with the hardware device, the counter value by one after receiving each confirmation that a consumer, among the plurality of consumers, has consumed the message.

20. The method of claim 19, further comprising: updating the pointer to a next message when the counter value is 0.

* * * * *